US008909712B2

(12) United States Patent
Singh et al.

(10) Patent No.: US 8,909,712 B2
(45) Date of Patent: Dec. 9, 2014

(54) SYSTEM AND METHOD FOR A GENERIC MOBILE SYNCHRONIZATION FRAMEWORK

(75) Inventors: Uma Kant Singh, Bangalore (IN); Ajit Kumar Narayanan, Bangalore (IN)

(73) Assignee: SAP AG, Walldorf (DE)

( * ) Notice: Subject to any disclaimer, the term of this patent is extended or adjusted under 35 U.S.C. 154(b) by 2088 days.

(21) Appl. No.: 10/720,669

(22) Filed: Nov. 25, 2003

(65) Prior Publication Data

US 2005/0114431 A1   May 26, 2005

(51) Int. Cl.
*G06F 15/16* (2006.01)
*G06F 17/30* (2006.01)
*G06Q 10/10* (2012.01)
*H04L 29/08* (2006.01)

(52) U.S. Cl.
CPC ...... *H04L 67/1095* (2013.01); *G06F 17/30575* (2013.01); *G06Q 10/10* (2013.01)
USPC ........................................................ 709/206

(58) Field of Classification Search
USPC .................... 709/248, 246, 201, 206; 707/10; 340/825.52, 825.53
See application file for complete search history.

(56) References Cited

U.S. PATENT DOCUMENTS

| | | | |
|---|---|---|---|
| 5,392,390 A * | 2/1995 | Crozier .......................... | 715/751 |
| 5,991,771 A * | 11/1999 | Falls et al. ..................... | 707/202 |
| 6,445,783 B1 * | 9/2002 | Creswell et al. ......... | 379/207.13 |
| 6,694,336 B1 * | 2/2004 | Multer et al. ................. | 707/201 |
| 6,993,522 B2 * | 1/2006 | Chen et al. ........................ | 707/7 |
| 7,286,567 B1 * | 10/2007 | Hennen et al. ................ | 370/509 |
| 7,415,486 B2 * | 8/2008 | Multer .......................... | 707/201 |
| 2002/0004906 A1 * | 1/2002 | Rajasekharan et al. ....... | 713/200 |
| 2003/0125057 A1 * | 7/2003 | Pesola ........................... | 455/502 |
| 2004/0064517 A1 * | 4/2004 | Uenoyama et al. ........... | 709/207 |
| 2007/0226272 A1 * | 9/2007 | Huang et al. .................. | 707/201 |
| 2007/0271395 A1 * | 11/2007 | Libman ......................... | 709/246 |

* cited by examiner

*Primary Examiner* — Jason Recek
(74) *Attorney, Agent, or Firm* — Mintz Levin Cohn Ferris Glovsky and Popeo, P.C.

(57) ABSTRACT

A generic mobile synchronization framework facilitates synchronization of data objects between platforms by comparing these data objects from one platform with a replica of data objects on the other platform. Generic messages identifying the differences in the data objects are converted into an adapted message suitable for use by the underlying synchronization hardware and sent to the platform needing synchronization. That platform converts adapted message to the corresponding original generic messages, and executes them, synchronizing the data objects in that platform with the originating platform.

9 Claims, 17 Drawing Sheets

SYSTEM AND METHOD FOR A GENERIC MOBILE SYNCHRONIZATION FRAMEWORK

TECHNICAL FIELD

This invention relates generally to methods and systems for synchronizing data, and more specifically to methods and systems for synchronizing data between two or more platforms using a generic synchronization framework.

BACKGROUND

With the advent of mobile computing, business professionals use multiple computing devices throughout the business day. For example, a business professional may use a desktop computer while at the office, a laptop computer while traveling on business, and a personal digital assistant ("PDA") while on a sales call. It is often necessary for the business professional to have access to the same data, regardless of which computing device the business professional is using. For example, a sales person will need access to pricing data on both his desktop computer and his laptop computer.

Over time, the data on the desktop computer, such as pricing data, may be changed and become inconsistent with the data on the laptop computer. Or, new information, such as a purchase order, may be entered on the laptop computer and not be consistent with sales data on the desktop computer. Using multiple devices for entering and storing common data requires synchronizing the data across the multiple devices to ensure that each device has the most current values for the data.

A user typically has both a principal computing platform that he uses as his main computing device to add, change, or delete data and one or more auxiliary computing platforms that he may also use to add, change, or delete data. The principal or auxiliary platforms may run Linux®, Windows®, MacOS®, Symbian®, Windows Mobile PocketPC®, or Palm® operating systems.

Currently, synchronization requires underlying synchronization software that depends on the specific computing platform needing synchronization. For example, Microsoft provides Activesync® synchronization software to synchronize data between applications such as Outlook® on principal platforms and auxiliary computing platforms running the Microsoft Windows Mobile PocketPC® operating system.

Underlying synchronization software tends to be closed, not allowing users or developers much control of the synchronization process. For example, most existing underlying synchronization software cannot perform synchronization between different types of objects. Software developers of an application on a principal computing platform may define a data object type on the principal computing platform differently from software developers of another application on an auxiliary computing platform. This may happen if the applications were not designed initially to have synchronized data objects. For example, if a given object on the auxiliary computing platform is defined as a "string" object type, and its corresponding object on the principal computing platform is defined as a "date" object type, conventional synchronization software would report an error on attempts to synchronize this object.

In addition, existing synchronization software does not enable a user or developer to set transaction boundaries. Thus, if a portion of a synchronization of an object or set of objects in a single transaction fails, synchronization of the entire transaction may fail and force a rollback to a previous state.

Existing synchronization software, such as Activesync, may permit plug-ins to allow third party applications a conduit to synchronize data between applications on principal and auxiliary computing platforms, but these plug-ins are usually written for specific third-party applications and specific synchronization software. The plug-ins usually depend heavily on the underlying synchronization software, such as Activesync, and the platforms, so changes to the underlying synchronization software, the auxiliary computing platform, or the third party application may require completely rewriting the plug-in. Moreover, multiple applications cannot easily use the same plug-in to transfer and synchronize data.

SUMMARY

A system consistent with the present invention includes a microprocessor and memory coupled to the microprocessor. The microprocessor is operable to: create a set of generic messages identifying changes to the data objects since a previous synchronization; convert the generic messages to adapted messages; send the adapted messages from the first platform to the second platform; convert the adapted messages to generic messages on the second platform; and update the data objects on the second platform using the generic messages.

A method consistent with the present invention includes: creating a set of generic messages identifying changes to the data objects since a previous synchronization; converting the generic messages to adapted messages; sending the adapted messages from the first platform to the second platform; converting the adapted messages to generic messages on the second platform; and updating the data objects on the second platform using the generic messages.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

The following description refers to the accompanying drawings in which, in the absence of a contrary representation, the same numbers in different drawings represent similar elements. The implementations in the following description do not represent all implementations consistent with the claimed invention. Instead, they are merely some examples of systems and methods consistent with the invention.

Figure 1:
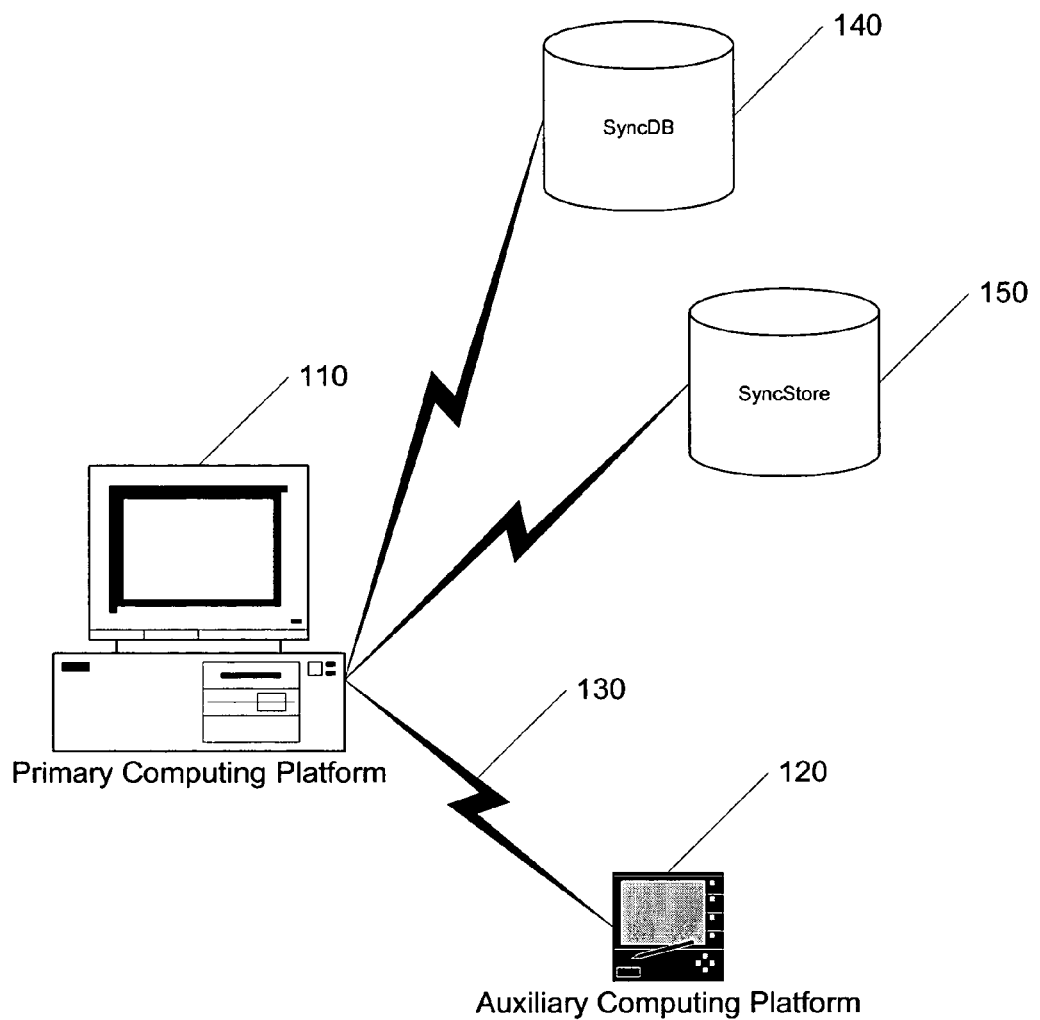
FIG. 1 is an illustration of a system consistent with the present invention in its operating environment.

FIG. 1 is an illustration of a system consistent with the present invention for synchronizing two or more platforms. For illustrative purposes, one platform is called a principal computing platform (PCP) 110 and the other an auxiliary computing platform (ACP) 120. PCP 110 may be any type of computing platform, such as a desktop, laptop computer, notebook computer, PDA, handheld computer, or pocket computer running applications with data to be synchronized with another platform, such as ACP 120.

ACP 120 may be any type of computing platform running applications with data that may be synchronized with another platform, such as PCP 110. Examples of ACP 120 include a desktop computer, a laptop computer, a notebook computer, a PDA, a handheld computer, or a pocket computer. Although this example involves synchronizing data between a principal and an auxiliary computing platform, the invention is not so limited and can operate in many other environments, such as between two principal or two auxiliary platforms.

PCP 110 communicates with ACP 120 over a communications link 130. One or more databases located remotely or at PCP 110 can communicate with PCP 110 and may store data about users of the system and synchronization data. For example, a synchronization database, SyncDB, 140, may store data relating to users and one or more of their associated ACPs 120. A SyncStore Database 150 may store data relating to the data objects to be synchronized. Those skilled in the art will appreciate that the actual location and structure of database elements is flexible and a matter of design choice.

Systems consistent with the principles of the present invention may comprise a generic mobile synchronization framework ("GMSF") that facilitates communication of data between applications and underlying synchronization architecture. Instances of the GMSF are located in both the PCP 110 and the ACP 120. The GMSF provides an application interface module that interfaces the GMSF to the applications.

The underlying synchronization architecture may be a combination of underlying synchronization software, such as Microsoft's Activesync, and the hardware upon which it resides, such as hardware operating Windows operating systems. Instances of the GMSF may be found on both PCP 110 and ACP 120 to allow applications to communicate with the underlying synchronization software. By being loosely tied to the underlying synchronization architecture, PCP applications, and ACP applications, the GMSF provides a flexible, reusable system that reduces the complexity of synchronizing applications.

The GMSF may use one or more synchronization adapters that interface the GMSF to the underlying synchronization software. Thus, the synchronization framework may be reusable as the underlying synchronization software or applications calling on the GMSF change.

Consistent with the present invention, the GMSF may provide a mapping mechanism to allow a user or designer to map data objects from an application on one platform, such as PCP 110, to an application on another platform, such as ACP 120. In addition, the GMSF may provide pluggable data converters that allow data-type conversions between platforms. Data-type conversions, for example from string-type data to real-number-type data, are necessary where corresponding data objects in the PCP 110 and the ACP 120 are defined to be of different data-types.

A delta processor in the GMSF determines the differences between data objects in the platforms, and thus identifies that changes have occurred that need synchronization. A user or designer may override an intrinsic (or default) delta processor, substituting the user's or designer's own custom delta processor.

In addition, many data objects may relate to a single transaction, such as a purchase order. The GMSF may group the related data objects together as a transaction, so that if data synchronization for a transaction fails, all related data objects of the transaction may revert to a previous state without affecting other objects.

The GMSF may also allow the user or developer to categorize data so the user can load or synchronize data based on categories. Certain data objects may never change, or change infrequently, so categorization of data objects is beneficial.

Furthermore, the PCP and the ACP may be located remote from each other, for example when a sales person is on the road, so the GMSF may be socket-aware using the socket mechanism of TCP/IP to synchronize data remotely between the PCP 110 and ACP 120.

Figure 2:
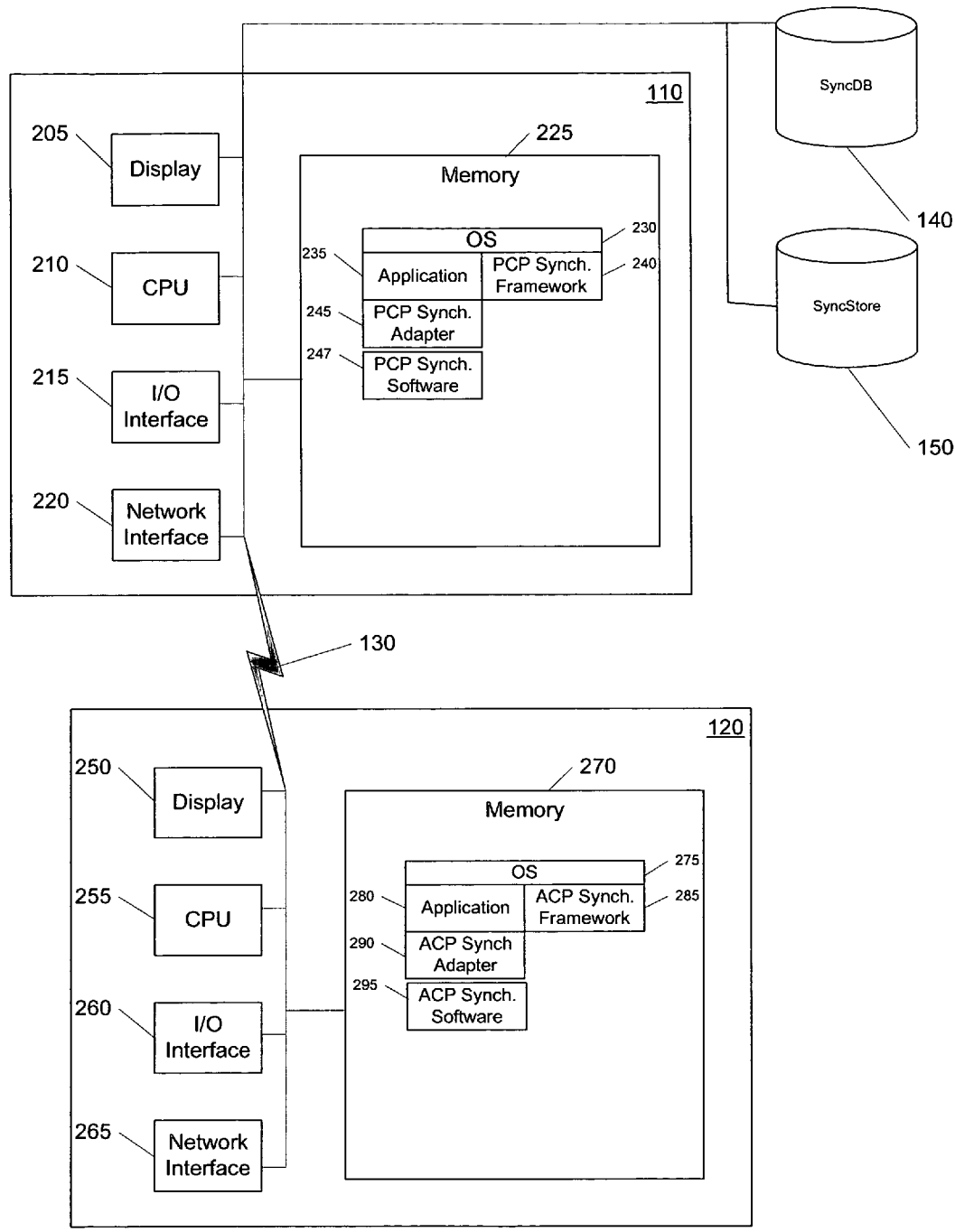
FIG. 2 is a block diagram of hardware components of a principal and auxiliary computing platform consistent with the present invention.

FIG. 2 is a block diagram of components of PCP 110 and ACP 120 consistent with the present invention. PCP 110 may be a general-purpose computer running a computer program or a specially constructed computing platform for carrying-out the operations described below. PCP 110, having CPU 210, may transfer data objects and messages via I/O interface 215 (which can be any conventional I/O device) or network interface 220 (which can be any conventional interface) by direct connections or other communication links. PCP 110 may also provide a local or remote display 205.

Alternatively, PCP 110 can be part of a network such as a telephone-based network (such as a PBX or POTS), a local area network (LAN), a wide area network (WAN), a dedicated intranet, and/or the Internet. In this way, PCP 110 may be located near or far from ACP 120 and databases 140 and 150.

Memory device 225 may be implemented with various forms of memory or storage devices, such as read-only memory, random access memory, or external devices. Typically, memory device 225 stores instructions forming an operating system 230; an application program 235 having one or more data objects for synchronization; a PCP synchronization framework module 240 for providing generic synchronization functions; and a PCP synchronization adapter 245 for communicating messages and data objects between the PCP synchronization framework module 240 and a PCP synchronization software 247 for providing the underlying synchronization software.

Similar to PCP 110, ACP 120 may be implemented by a general-purpose computer running the appropriate computer programs stored in the computer, or a specially constructed computing platform. ACP 120 may also be implemented with a wide variety of components including, central processing unit 255, I/O interface 260, network interface 265, and display 250.

As with PCP 110, ACP 120 can communicate via any appropriate type of network, allowing ACP 120 to be located in the same or distant location from PCP 110 and databases 140 and 150.

Also, similar to I/O interface 215, I/O interface 260 may be implemented with a wide variety of devices. The same is true of network interface 265 and memory device 270.

Memory device 270 may contain instructions forming: an operating system 275; an application program 280 having one or more data objects for synchronization; an ACP synchronization framework module 285 for providing generic synchronization functions; an ACP synchronization adapter 290 for communicating messages and data objects between the ACP synchronization framework module 240, and an ACP synchronization software 295 for providing the underlying synchronization software.

Figure 3:
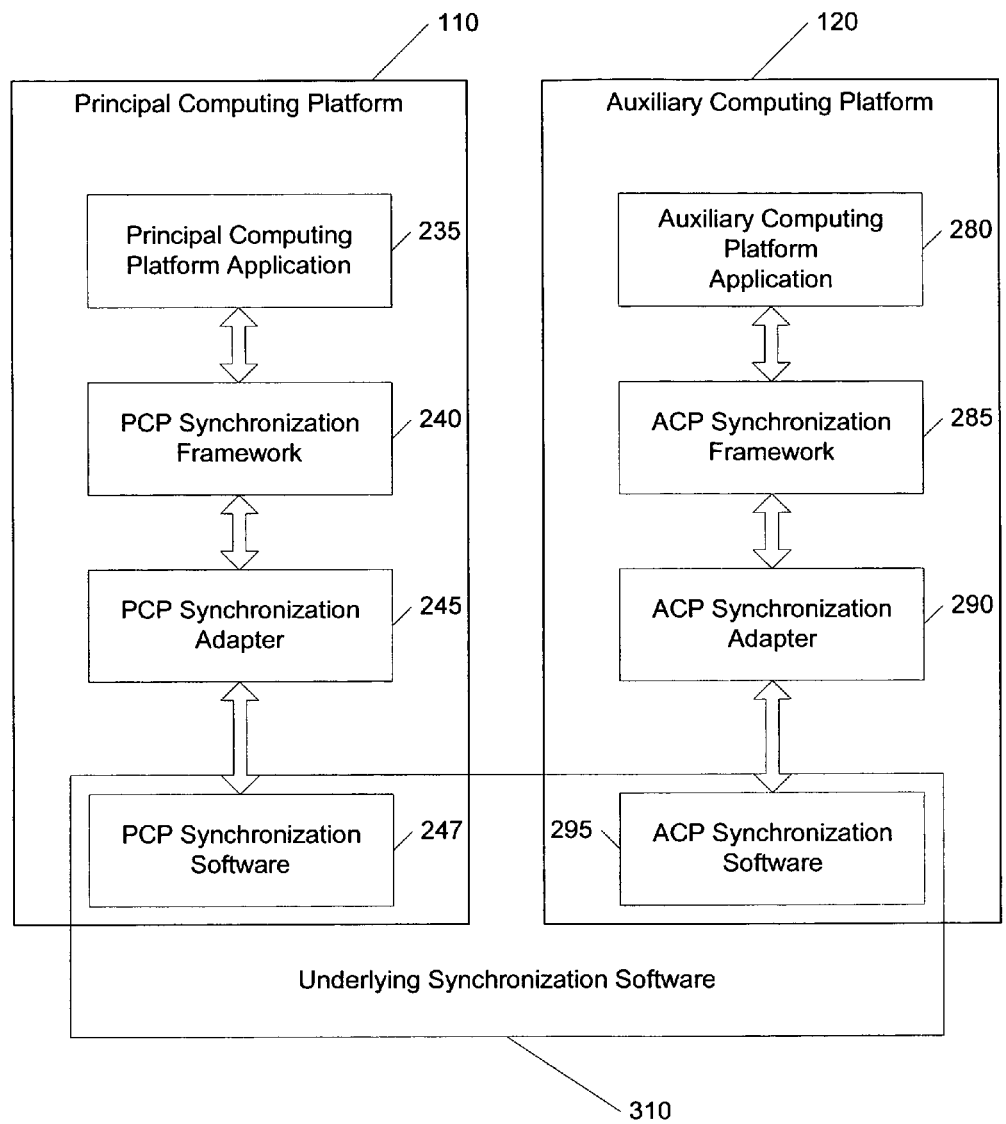
FIG. 3 is a functional block diagram of possible operations in the principal and auxiliary computing platforms consistent with the present invention.

FIG. 3 is a functional block diagram of operations performed by PCP 110 and ACP 120. PCP application 235 in PCP 110 has one or more data objects to be synchronized. Each data object may be assigned a unique data object identifier. For example, a universally unique identifier ("UUID") may be assigned to each data object. A UUID is an identifier that can be used across all computers and networks wherever a unique identifier is required. Such an identifier has a very low probability of being duplicated. For example, in the Windows.NET® framework a UUID may be implemented through a globally unique identifier ("GUID"), which is a 128-bit integer (16 bytes) identifier that serves as a UUID. Because the creation of UUID's in some frameworks, such as the Windows.NET® framework, requires the presence of a network adapter and some ACPs 120 may not feature a network adapter, for example in a Windows Mobile® device, the PCP 110 may generate one or more unassigned UUIDs for transfer to the ACP 120. The ACP 120 may use these received unassigned UUIDs when new data objects are generated in ACP 120.

Messages exchange information about data objects between PCP 110 and ACP 120. When generating messages from PCP 110 to ACP 120, the data objects used by PCP application 235 pass to PCP synchronization framework 240. PCP synchronization framework 240 is an instance of the generic mobile synchronization framework operating on PCP 110. Data objects may be passed from PCP application 235 to PCP synchronization framework 240 by a meta-data descriptor file, such as an XML file. By using a meta-data descriptor file, the PCP synchronization framework 240 is open to understand new types of objects dynamically. As described elsewhere, and understood by those skilled in the art, meta-data descriptor files typically contain not only data objects but also descriptions of the fields of the data objects.

PCP synchronization framework 240 compares the data objects with replicas of corresponding data objects on ACP 120. The replicas represent the last known state of data objects used by an ACP application in the ACP 120. The replicas of corresponding data objects on ACP 120 may initially be created during the first synchronization from PCP 110 to ACP 120, and may later be updated during subsequent synchronizations. PCP synchronization framework 240 generates generic messages, such as messages in a standard format like SQL, to add, modify, or delete data objects on the ACP 120. PCP synchronization framework 240 then passes the generic messages to PCP synchronization adapter 245, which converts the generic messages to an adapted message format used by the underlying synchronization software. A generic message is one that does not depend on a specific platform.

The underlying synchronization software 310 then transfers the adapted messages to ACP Synchronization Adapter 290 in ACP 120, which converts the adapted messages to generic messages. The ACP synchronization framework 285, an instance of the generic mobile synchronization framework in ACP 120, executes the add, modify, or delete data functions in the generic messages to synchronize the data objects used by the corresponding ACP application 280.

When generating messages from the ACP 120 to the PCP 110 (for example, due to a change in data objects in the ACP 120) during synchronization, the ACP synchronization framework 285 generates generic messages that pass to ACP synchronization adapter 290. ACP synchronization adapter 290 converts the generic messages to adapted messages and passes the generic messages via the underlying synchronization software 310 to PCP synchronization adapter 245, which converts the messages back to the generic format before passing them to PCP synchronization framework 240. PCP synchronization framework 240 executes the actions in the messages on PCP application 235's data objects and on the replica data objects.

Figure 4:
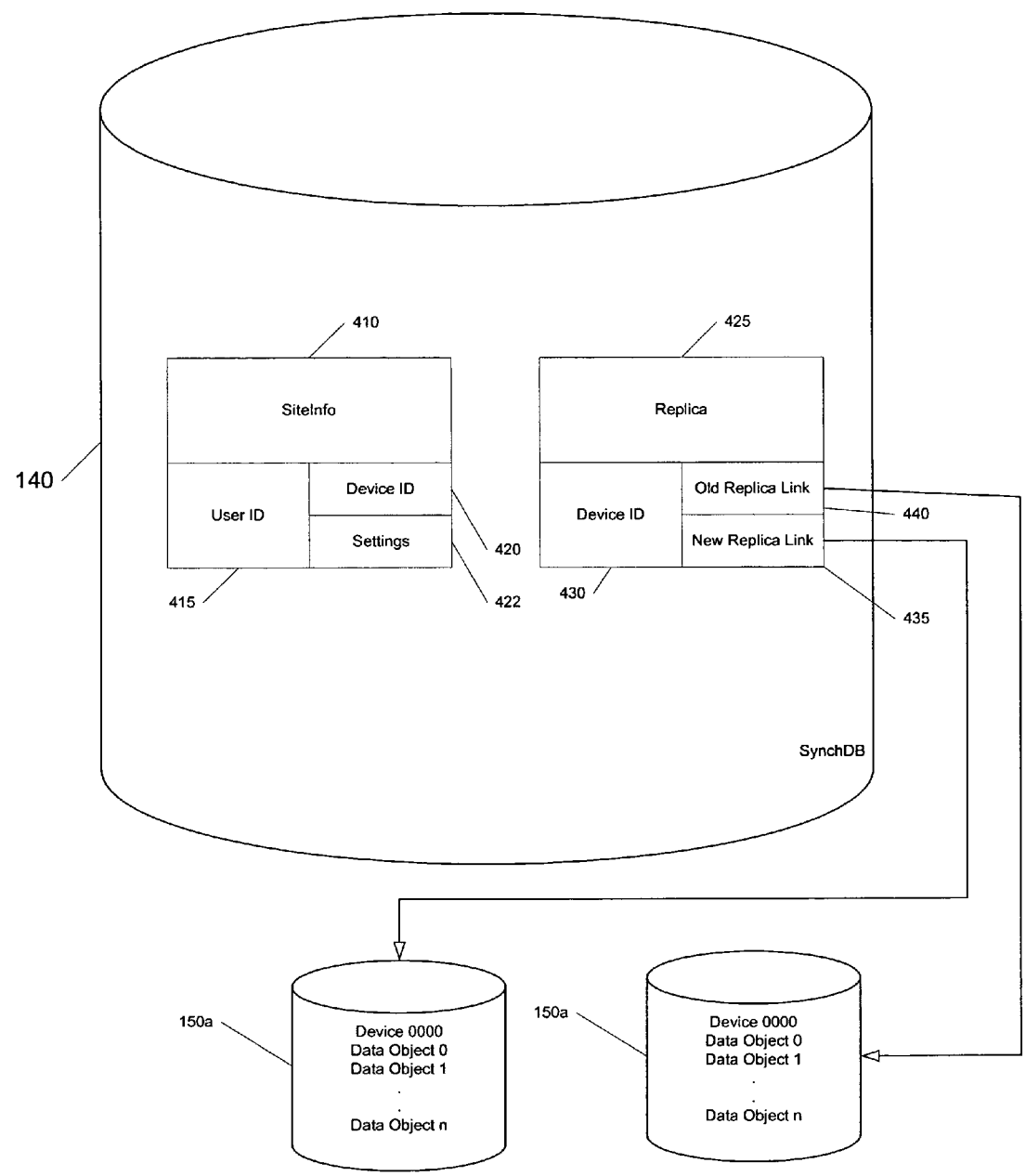
FIG. 4 is a diagram of a synchronization database and tables consistent with the present invention.

FIG. 4 is a diagram of SyncDB 140 and its associated tables consistent with the present invention. The SyncDB can be coupled to one or more SyncStore databases 150a. SyncDB 140 may contain one or more tables used in the synchronizing process. SiteInfo table 410 may contain entries linking User Identifiers 415 to respective Device Identifiers 420. User Identifiers 415 may be unique characters to identify an individual. Device Identifiers 420 may be unique characters to identify an ACP. Each User Identifier 415 may link to one or more Device Identifiers 420. Thus, each user may synchronize multiple devices to a PCP application 235. Settings 422, to be discussed later, may be stored in association with the User Identifiers 415.

SyncDB 140 may also contain a replica database 425 representing a copy of the data objects stored in ACP 120. Replica database 425 may link a Device Identifier 420 with one or more replica database links 435, 440. An "old" replica database link 440 identifies a copy of a previous replication of the data objects in the corresponding Device Identifier 420. A "new" replica database link 435 identifies a copy of a current replication of the data objects in the corresponding Device Identifier. Linking to a database of an old and new copy of the ACP data objects permits two features. First, the links allow easy rollback of data objects in ACP 120 in case of a transaction error. Second, maintaining a copy of the current data objects in the ACP permits rapid calculation of the differences between PCP and ACP application data objects during synchronization without having to upload or transfer data from the ACP.

Figure 5:
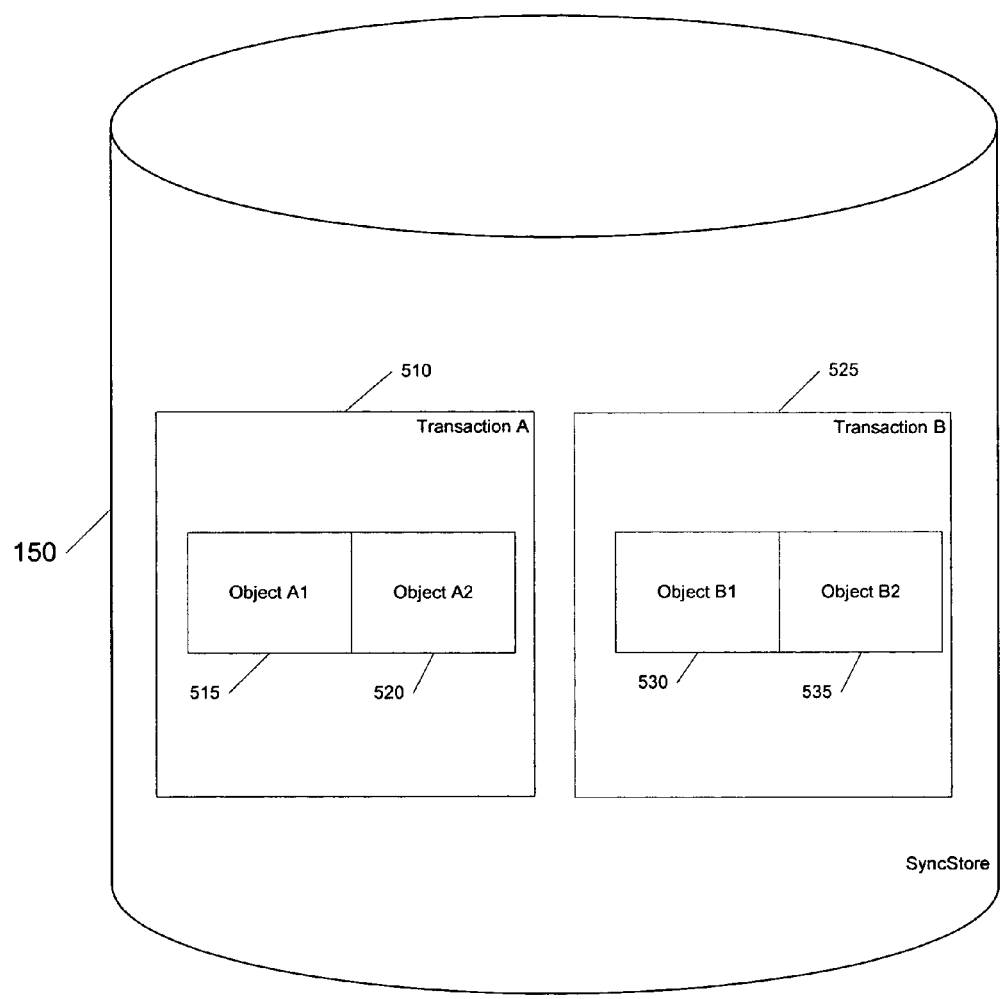
FIG. 5 is a diagram of a synchronization store database and data objects consistent with the present invention.

FIG. 5 is a diagram of SyncStore database 150 and its stored data objects consistent with the present invention. During synchronization, data objects from PCP application 235 may be replicated, stored, and grouped together in SyncStore database 150. For example, all data objects 515, 520 supporting Transaction A 510 may be grouped. Similarly, all data objects 530, 535 supporting Transaction B 525 may be grouped. Thus, for example, if an error is generated with respect to any data object association with a transaction, the grouping allows rollback or cancellation of all data object synchronizations related to that transaction.

Figure 6:
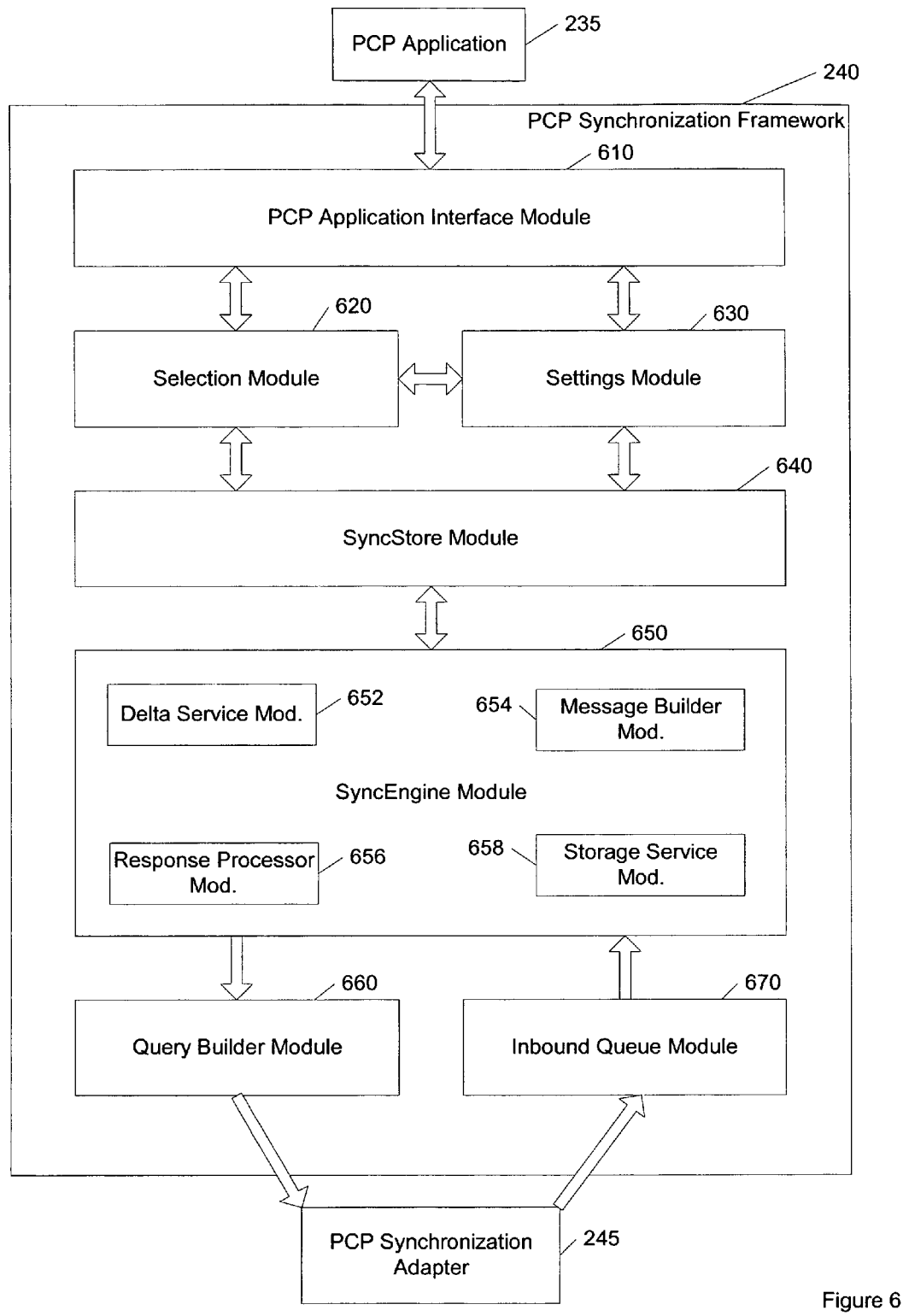
FIG. 6 is a functional block diagram of possible operations by a computing platform synchronization framework consistent with the present invention.

FIG. 6 is a functional block diagram of operations PCP synchronization framework 240 carries out consistent with the present invention. As explained above, PCP synchronization framework 240, an instance of the GMSF, lies between the PCP application 235 and the PCP synchronization adapter 245. PCP application interface module 610 may interface to and transfer data objects to and from the PCP application 235. It may also provide additional commands within PCP application 235 to allow users of PCP application 235 to select settings and initiate synchronization.

PCP application interface module 610 provides the flexibility to interconnect different PCP applications 235 to PCP synchronization framework 240 without requiring an entirely new set of code each time. Instead, only PCP application interface module 610 need be changed to interface with different applications. For example, a programmer could create one PCP application interface module 610 to connect to one business application and another PCP application interface module 610 to connect to another business application, without having to create an entirely new PCP synchronization framework 240. The programmer would merely place the proper objects and methods in place to interface to the appropriate application data objects. This promotes the reuse of code to reduce programming expenses and time as compared to an entire rewrite of most of the framework code.

Settings module 630 may permit the user, via PCP application interface module 610, to select various settings and parameters for synchronization. These settings may then be stored in a database, such as SyncDB, and associated with a User Identification 415 for the user. Settings may include ACPs associated with the user of the application or PCP, specialized delta calculators (explained above), categorization of data objects, and synchronization settings for categories.

Categories are useful to group data objects, for example, by their frequency of change. A user may select one set of data, such as pricing tables, to be placed in one category and another set of data, such as purchase orders, to be placed in another category. The user may select the category containing the pricing tables to be synchronized only on the first of the month, and the second category, purchase orders, to be synchronized every time ACP 120 is synchronized.

Selection module 620 may select the appropriate data objects, to pass from PCP application 235 to SyncStore module 640 during synchronization. The selection can depend on the setting stored, for example, in SyncDB.

SyncStore module 640 may create a copy of the data objects received from PCP application 235 via selection module 620. SyncStore module 640 may save this copy in SyncStore database 150. As explained above, SyncStore module 640 may group related data objects into a transaction within the SyncStore database, and there may be multiple transactions within SyncStore database 150. For example, SyncStore database 150 may contain one transaction having data objects relating to one purchasing transaction and another transaction having data objects relating to another purchasing transaction.

Methods and objects in SyncStore database 150 may include: StoreUser (the User Identifier associated with the object); TargetSiteID (the Device Identifier for the ACP intended to be synchronized); synchronization type (Normal Synchronization, Data Recovery [skipping the delta process and pushing data to the ACP from the previous replica regardless of any data changes in the PCP], or Forced Synchronization [skipping the delta process and pushing data to the ACP from the PCP regardless of the content of the replica]); Begin Transaction (noting the beginning of a series of data objects for a transaction); End Transaction (noting the end of a series of data objects for a transaction; one or more data objects); SyncNow (to initiate synchronization); and Status.

After establishing SyncStore database 150, SyncStore module 640 may set the status of the database to "Created." During synchronization, the status of the store may also be set to: "Delta Processed" (the delta process has been run on the store); "MessageBuilt" (messages have been built based on the results of the delta process); "Replicated" (the store has been replicated); "Error"; "Closed"; or "Discarded."

After creating database 150, SyncStore module 640 may notify a syncengine module 650 to begin its synchronization functions. Syncengine module 650 may comprise a delta services module 652, a message builder module 654, a response processor module 656, and a storage services module 658. Once syncengine module 650 receives a synchronization notice from SyncStore module 640, syncengine module 650 may request storage services module 658 to retrieve the content of the SyncStore to be synchronized. Next, syncengine module 650 may use the delta services module 652 to compute additions, deletions, and changes to ACP 120 data objects by passing it a copy of the store and the replica (based on the Device Identifier). The delta services module 652 may be pluggable so that a user or developer can replace the standard module with a customized module.

Once delta services module 652 computes the differences in the data objects, message builder module 654 may generate generic messages, in conjunction with query builder module 660, to implement the differences on data objects in ACP 120. Messages may be built in a generic fashion, such as an SQL statement, or may be embedded within XML (extensible Markup Language) data. By using XML, metadata may be included in the messages to inform the recipient of the messages about not only the data itself, but also the data structure, i.e., fields, types, target fields, etc.

In addition, the message builder module 654 may be pluggable so that a user or developer can replace the standard module, described above, with a customized module.

Query builder module 660 also interfaces to the response processor module 656 and builds generic messages to pass to PCP synchronization adapter 245.

Response processor module 656 may handle inbound messages from ACP 120 retrieved from inbound queue module 670. For example, response processor module 656 may process error messages or inbound delta messages (to add, change, or delete data objects in the PCP because of changes in the ACP).

Figure 7:
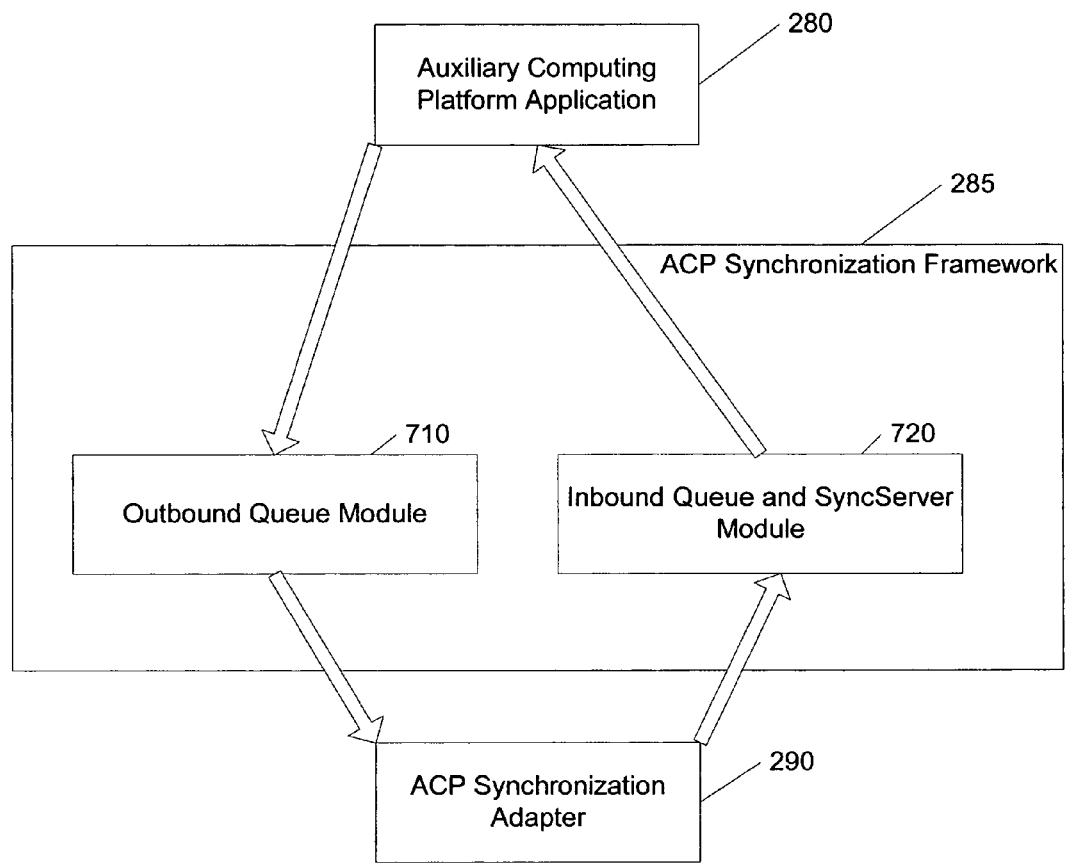
FIG. 7 is a functional block diagram of possible operations by an auxiliary computing platform synchronization framework consistent with the present invention.

FIG. 7 is a functional block diagram illustrating an ACP synchronization framework 285 consistent with the present invention. Because, in this embodiment, most of the work of the synchronization takes place on PCP 110, which is generally where the heaviest computing power is located, ACP synchronization framework 285 is much simpler. ACP synchronization framework 285 receives inbound messages from PCP 110 in the inbound queue and syncserver ("IQS") module 720. IQS module 720 executes the inbound messages on the data objects of the associated ACP application 280. Any errors or generated confirmations enter outbound queue module 710. Outbound queue module 710 also contains any data objects that may have been added or changed since the last synchronization, and may pass generic messages relaying these data objects to ACP synchronization adapter 290 for transfer to PCP 110.

FIGS. 8-17 are flowcharts providing more detail on the synchronization processes, which the modules described above, or other modules, can carry out. Those skilled in the art will appreciate that the process flows may be implemented in a variety of fashions. Although these flowcharts illustrate most features of the processes, they may, for purposes of clarity, omit some features in the following text.

Figure 8:
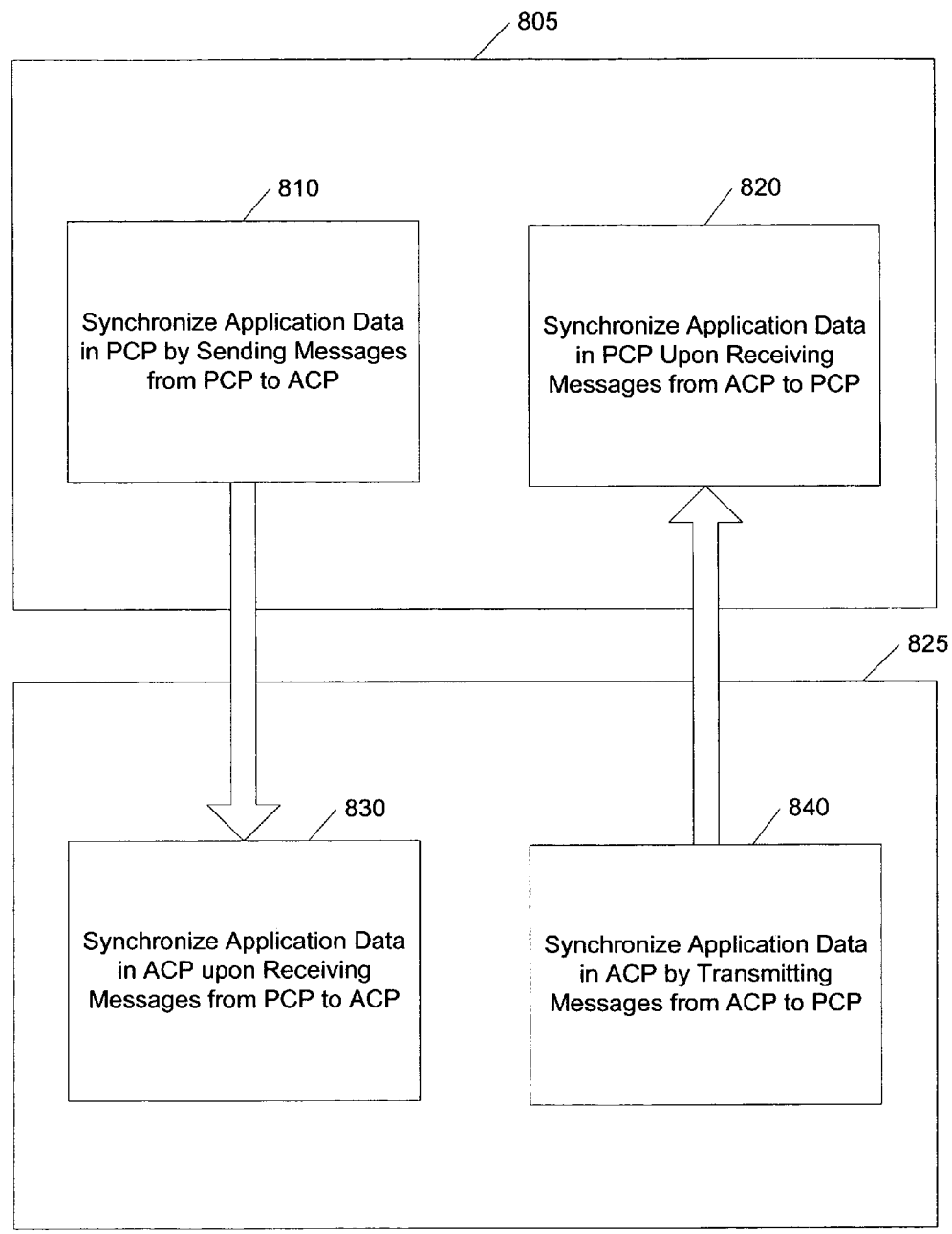
FIG. 8 is a flowchart of a generic mobile synchronization process consistent with present invention.

FIG. 8 is a flowchart of a GMSF consistent with present invention. The GMSP may include PCP GMSF 805 and ACP GMSF 825. PCP GMSP 805 may comprise a PCP-PCP-ACP process ("PPA") 810 and a PCP-ACP-PCP ("PAP") process 820. ACP GMSF 825 may comprise an ACP-PCP-ACP process ("APA") 830 and an ACP-ACP-PCP ("AAP") process 840. PPA process 810 sends synchronization messages to APA process 830 for execution. AAP process 840 sends synchronization messages to AAP process 820 for execution.

Figure 9:
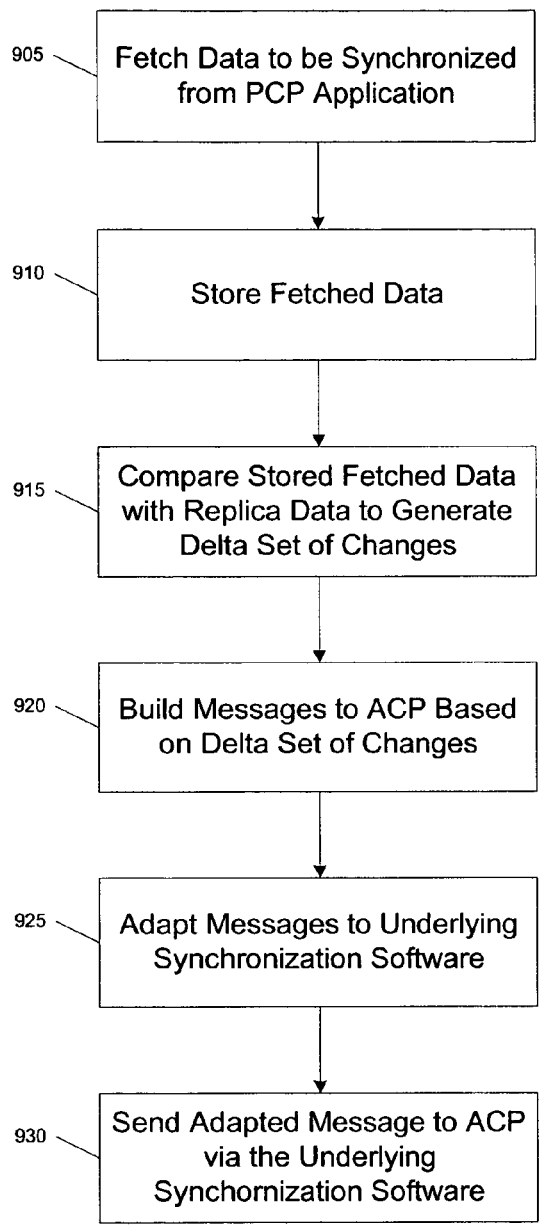
FIG. 9 is a flowchart of a PCP-PCP-ACP process consistent with the present invention.

FIG. 9 is a flowchart of a PPA process consistent with the present invention. Upon receipt of a synchronization command, PCP application interface module 610 retrieves data objects to be synchronized from PCP application 235 (stage 905).

Syncstore module 640 stores the fetched data objects (stage 910) and delta service module 652 compares them to a replica data set reflecting the last synchronization state of ACP 120 (stage 915). These actions generate a delta set of changes.

Message builder module 654 builds generic messages for ACP 120 to implement the delta set of changes (stage 920) and PCP synchronization adapter 245 changes the generic messages to adapted messages, i.e. message in a form compatible with the underlying synchronization software (stage 925). The underlying synchronization software then sends the adapted messages to ACP 120 (stage 930).

Figure 10:
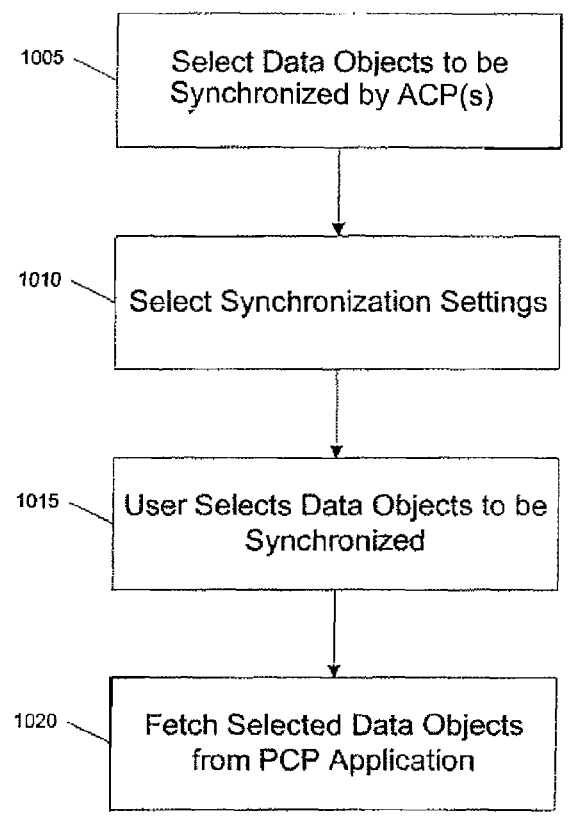
FIG. 10 is a flowchart of a fetch data process consistent with the present invention.

FIG. 10 is a flowchart of the "fetch data process" of stage 905 in FIG. 9 consistent with the present invention. Using selection module 620, the user may select data objects from PCP application 235 for synchronization and one or more ACPs (stage 1005) (via their respective IDs). Also, synchronization settings may be set using settings module 630, as previously explained (stage 1010).

A user may select all or some data objects for synchronization (stage 1015). User selection module 620 may present the user with a selection of data objects that may be synchronized, or the user may drag and drop data objects into categories. The application's APIs or standard data calls, such as SQL, then fetch the selected data objects from PCP application 235 (stage 1020).

Figure 11:
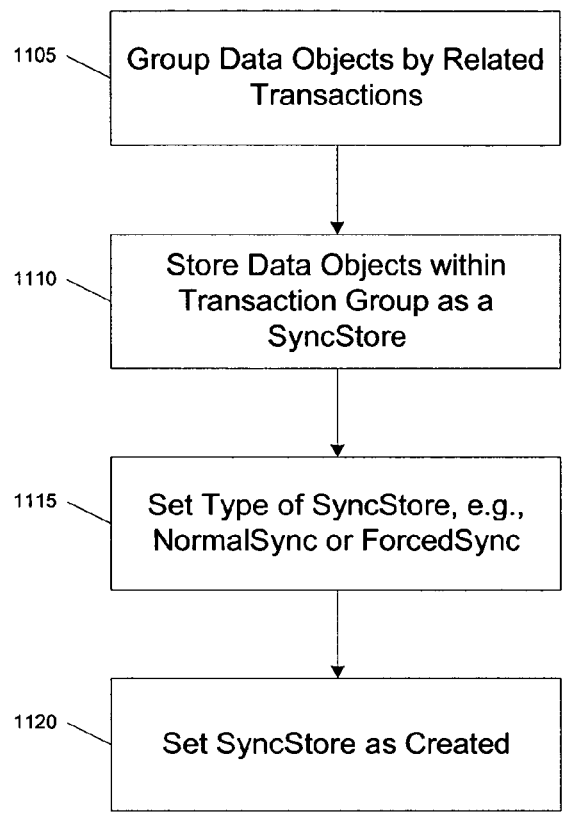
FIG. 11 is a flowchart of a store fetched data process consistent with the present invention.

FIG. 11 is a flowchart of the "store fetched data" process of stage 910 in FIG. 9 consistent with the present invention. Syncstore module 640 performs the stages of process 910. Data objects may be grouped together by transaction (stage 1105). The data objects are stored by transaction group within the SyncStore database 150. The SyncStore database 150 may carry data showing how to map data objects from PCP application 235 to ACP application 280. A program developer or user may initially map the data, and the user may manipulate this mapping data even if the developer initially maps the data. For example, a simple mapping chart showing the mapping of variables from the PCP data object to the ACP data object may permit manipulation of lines linking the variables. This allows a user to simply select a variable of the PCP data object, a variable of the ACP data object, and a link option.

In addition, type converting may take place during this process to convert data object properties of one type in PCP application 235 to another type in ACP application 280. Type converters may be built into the system or added by the user or developer using plug-ins. Type converting is useful if PCP application 235 does not use data types consistently with ACP application 280.

Next, the synchronization type is set (stage 1115). A synchronization type defines the extent to which the delta processor will be used and, if the delta processor is not used, what will replace the standard output of the delta processor. For example, the synchronization type may be "normal synchronization," "forced synchronization," or "data recovery synchronization." "Forced synchronization" may be used to ignore the content of the ACP data objects in the replica, and force the ACP data objects to reflect the content of the PCP data objects. Thus, "forced synchronization" bypasses the delta processor and forces the ACP data objects to be a copy of the PCP data objects, regardless of any changes, deletions, or additions made since the last synchronization.

"Data recovery synchronization" may be used if the ACP data objects are all lost in order to recover the ACP data objects to their last known state if desired. Similar to "forced synchronization," "data recovery synchronization," may bypass the delta processor and force a copy of the replica database to the ACP. The user may select the type of synchronization by the settings, as previously described. The data objects in the SyncStore are then set to "created" by syncstore module 640 (stage 1120).

Figure 12:
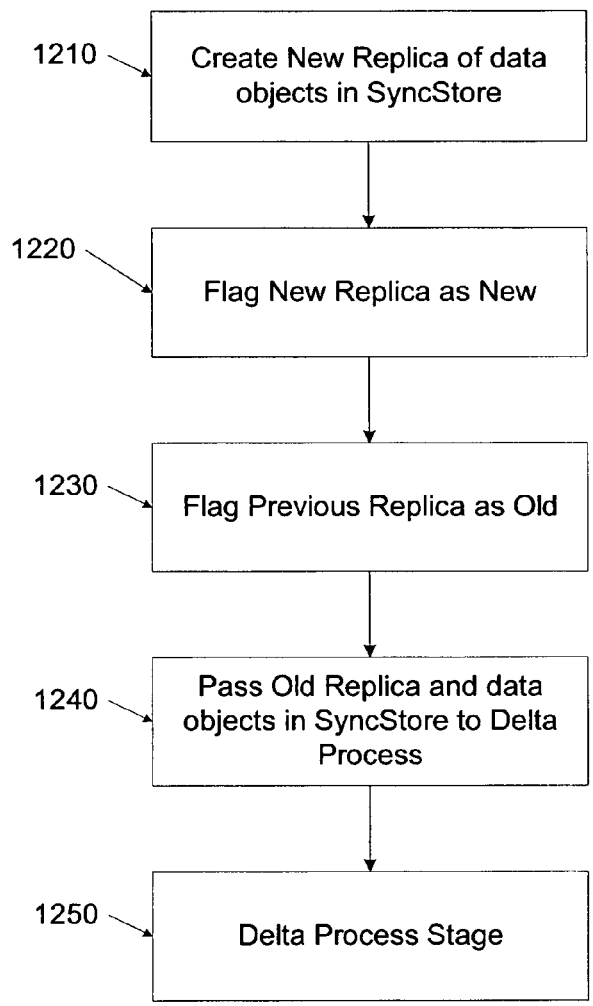
FIG. 12 is a flowchart of a compare process consistent with the present invention.

FIG. 12 is a flowchart of the "compare process" of stage 915 in FIG. 9 consistent with the present invention. Syncengine module 650 may perform this process. Module 650 creates a replica of data objects in SyncStore 150 (stage 1210). This replica becomes flagged as the new replica of the data objects in ACP 120 because the new replica should be the same as the SyncStore data objects if the synchronization is processed without error (stage 1220). The previous new replica is subsequently reflagged as the old replica (stage 1230). The old replica and the SyncStore data objects pass to the delta services module 652 for comparison (step 1240).

Figure 13:
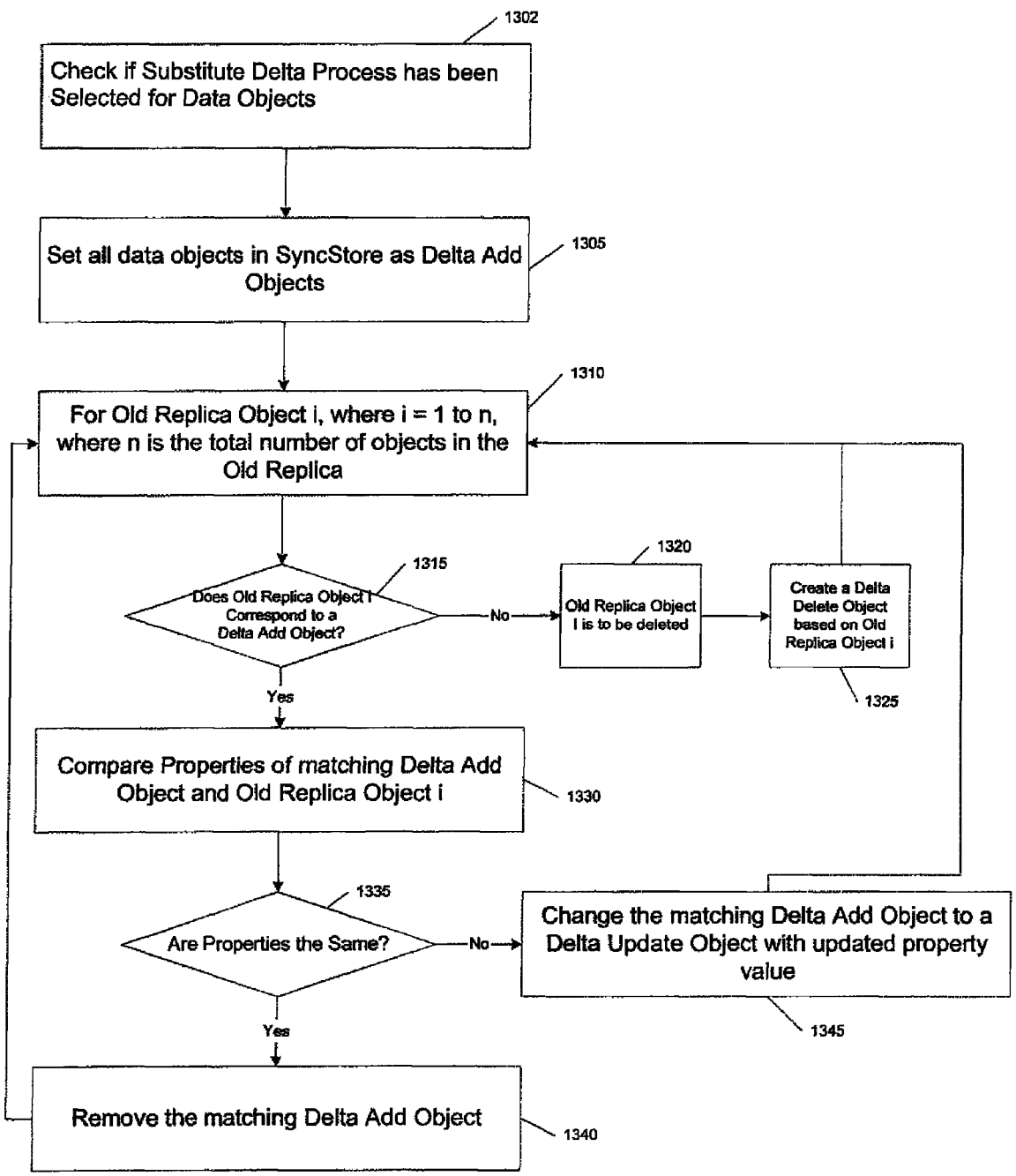
FIG. 13 is a flowchart of a delta generation process consistent with the present invention.

FIG. 13 is a flowchart of a standard delta generation process of stage 915 in FIG. 9 consistent with the present invention. The illustrated delta generation process may be for the default delta generation process in delta services module 652. Upon entry of the delta generation process, an initial check is made to see if a plug-in or substitute delta generation process has been selected for these data objects (stage 1302). If so, the plug-in delta generation process is executed in place of the standard one.

Assuming the standard delta generation process 1250 is to be used, Delta Add Objects are created for each data object in the SyncStore (stage 1305). Initially the delta generation process begins by assuming that all data objects in the SyncStore must be added to the ACP application 280's data objects. Process 1250 then begins to check each data object in the old replica against each data object in SyncStore 150 (stage 1310). If process 1250 does not find the old replica data object in a Delta Add Object (stage 1315), PCP application 235 has likely deleted the old replica data object (stage 1320). If so, the Delta Add Object changes to a Delta Delete Object to indicate that this data object needs to be deleted from ACP application 280's data objects (stage 1325).

If process 1250 finds the data object from the old replica in the Delta Add Objects, it compares the data object in the matching Delta Add Object and the old replica data object (stage 1330). If the data objects are the same (stage 1335), the Delta Add Object is removed (stage 1340). Otherwise, the Delta Add Object is changed to a Delta Change Object with updated data object values (stage 1345). Thus, the results of delta generation process 1250 may be Delta Add Objects, Delta Delete Objects, or Delta Change Objects.

Figure 14:
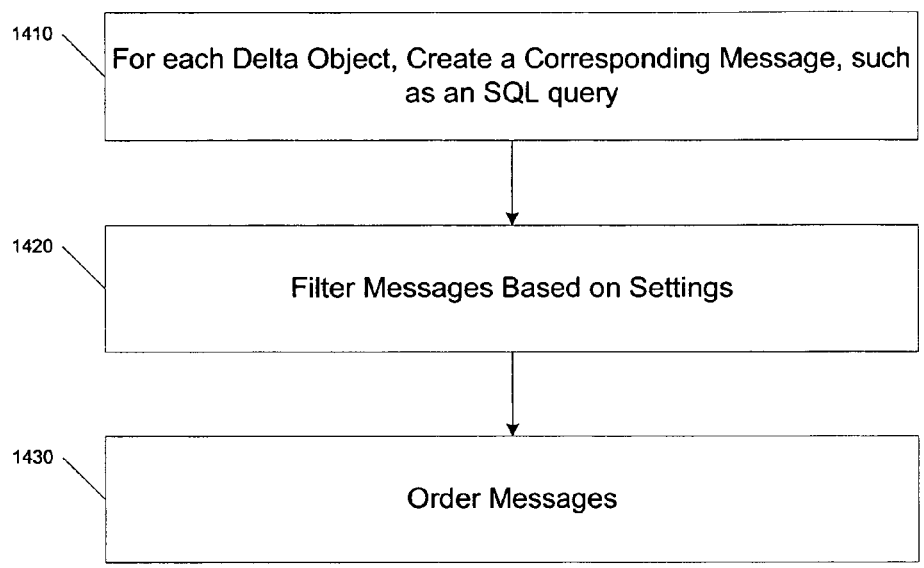
FIG. 14 is a flowchart of a message building process consistent with the present invention.

FIG. 14 is a flowchart of the message building process of stage 920 in FIG. 9 consistent with the present invention. In message builder module 654 and query builder module 660, a corresponding generic message is created for each delta object generated by delta generation process 1250, (stage 1410).

Messages may then be filtered based on user settings (stage 1420). For example, the user may elect to not allow changes in a data object to propagate to ACP application 280 (stage 1420).

The generic messages are ordered to facilitate execution in ACP 120 (stage 1430). Generic messages are ordered so that operations that took place on PCP application 235's data objects are properly replayed in ACP application 280's data objects. For example, a data table may be created in ACP application 280, followed by the insertion of information in the data table. Messages sent to PCP application 235 must be replayed in proper order, so that the data table is created by a first message before subsequent messages insert information in the data table.

Figure 15:
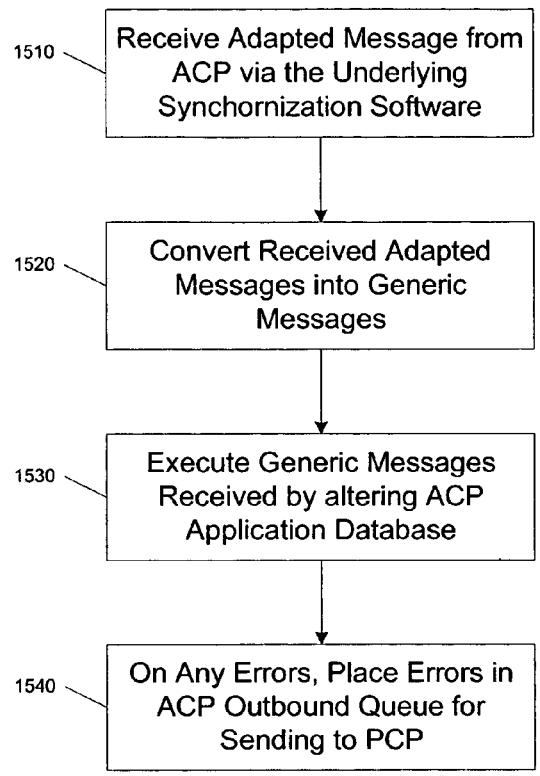
FIG. 15 is a flowchart of an ACP-PCP-ACP process consistent with the present invention.

The remaining processes are described more briefly because the details of all are similar to the PPA process. FIG. 15 is a flowchart of APA process 830 consistent with the present invention. Using ACP synchronization adapter 290, the process receives adapted messages from ACP 120 via the underlying synchronization software (stage 1510). The ACP synchronization adapter 290 converts adapted messages into generic messages (stage 1520). IQS module 720 may then execute the generic messages on the data store of ACP application 280 (stage 1530). If any errors occur upon such execution, IQS module 720 places the errors entering an ACP outbound queue for relaying back to PCP application 235 (stage 1540).

Figure 16:
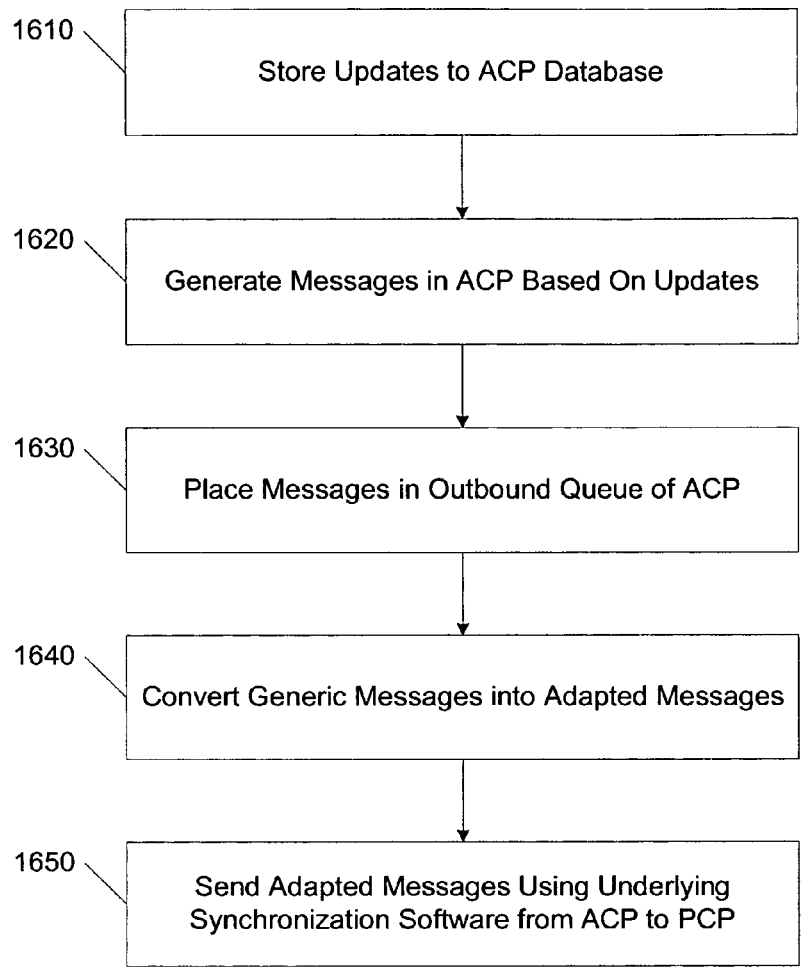
FIG. 16 is a flowchart of an ACP-ACP-PCP process consistent with the present invention.

FIG. 16 is a flowchart of the AAP process 840 consistent with the present invention. ACP application 280 processes updates in ACP 120 (stage 1610). For example, ACP application 280 may add, delete, or change data objects. ACP synchronization framework 285 generates generic messages in ACP 120 reflecting these changes. The messages include a time stamp to indicate the order in which the data objects were added, deleted, or changed (stage 1620). Outbound queue module 710 places the generic messages in the outbound queue of ACP 120 (stage 1630). The outbound queue may also contain generic messages regarding any errors that may have occurred during the downstream synchronization from the PCP to the ACP. ACP synchronization adapter 290 converts the generic messages into adapted messages (stage 1640). The adapted messages are then sent to the PCP via the underlying synchronization software (stage 1650).

Figure 17:
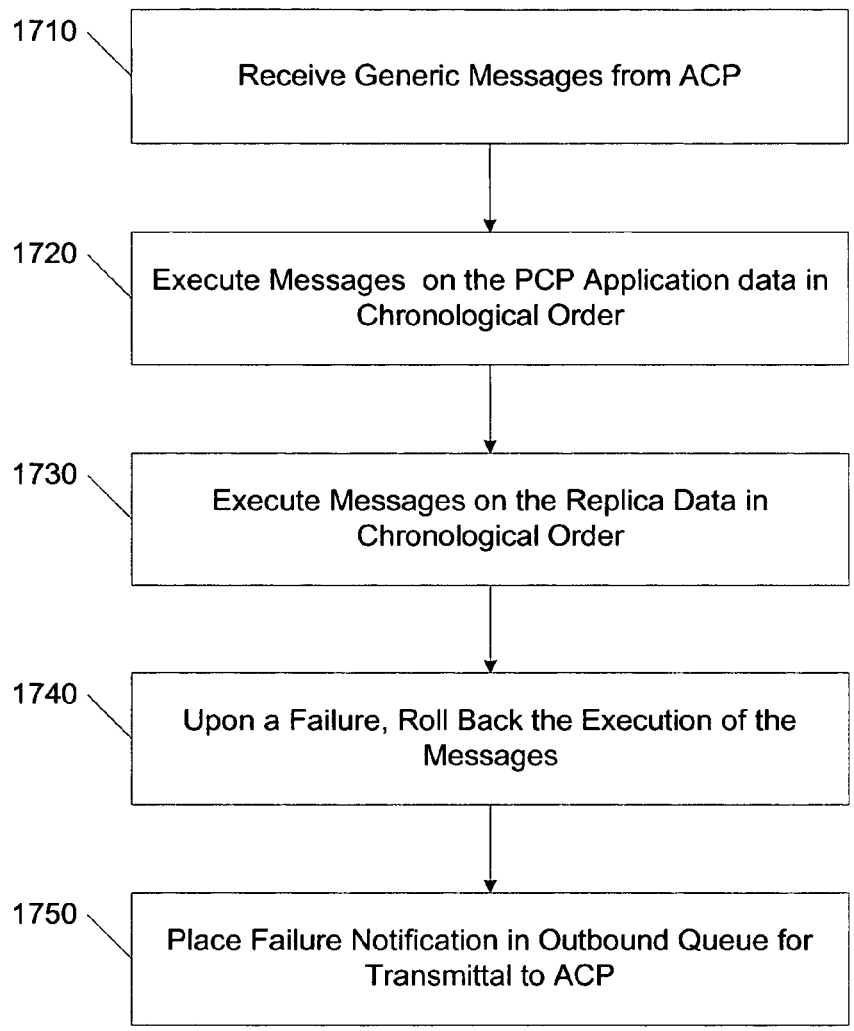
FIG. 17 is a flowchart of a PCP-ACP-PCP process consistent with the present invention.

FIG. 17 is a flowchart of the PAP process 820 consistent with the present invention. PCP 110 receives adapted messages from ACP 120, and PCP synchronization adapter 245 converts them into generic messages (stage 1710). PCP application interface module 610 executes the generic messages on the PCP application data in chronological order so that the PCP application data accurately reflects the changes made in the ACP 120 (stage 1720). Syncstore module 640 executes the generic messages on the new replica data (stage 1730). If there is a failure in execution, all messages relating to a given transaction may be rolled back (stage 1740), and a failure notification may be placed by response processor module 656 in the outbound queue of PCP 110 for transfer to ACP 120 (stage 1750).

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in may other ways, using equivalents and alternatives that do not depart from the scope of the following claims. Moreover, unless indicated to the contrary in the preceding description, none of the components described in the implementations is essential to the invention.

The invention claimed is:

1. A system for synchronizing data objects for a user between a primary platform and a plurality of auxiliary platforms comprising:
   a memory; and
   processing means, coupled to the memory, to execute at least one computer program for:
      creating, by a primary platform synchronization framework, a set of generic messages identifying changes to the data objects on the primary platform since a previous synchronization, the generic message not being dependent on a specific platform;
      accessing a database to obtain a user identifier, the user identifier being associated with the user and linking to two or more device identifiers, the device identifiers identifying the plurality of auxiliary platforms;
      converting, by a primary platform synchronization adapter, the generic messages to adapted messages corresponding to each of the auxiliary platforms based on the obtained user identifier and the linked device identifiers, the adapted messages being in adapted message formats used by underlying synchronization software;
      sending the adapted messages from the primary platform to auxiliary platform synchronization adapters in the corresponding auxiliary platforms;
      converting, by the corresponding auxiliary platform synchronization adapters, the adapted messages to generic messages on each of the auxiliary platforms; and
      executing, by an auxiliary synchronization framework on each corresponding auxiliary platform, add, modify, and/or delete functions in the generic messages to synchronize the data objects used by a corresponding auxiliary platform application.

2. A computer-implemented method for synchronizing data objects for a user between a primary platform and a plurality of auxiliary platforms comprising
   accessing a synchronization store database to obtain data characterizing changes to the data objects on the primary platform since a previous synchronization;
   creating a set of generic messages identifying changes to the data objects on the primary platform since the previous synchronization based on the data obtained from the synchronization store database, the generic messages being platform independent;
   accessing a synchronization database, the database comprising a first table with entries linking a user identifier for the user with two or more device identifiers stored in the database, the device identifiers identifying the plurality of auxiliary platforms, the adapted messages being in a form compatible with underlying synchronization software executing on the corresponding auxiliary platform;
   converting the generic messages to adapted messages corresponding to each of the auxiliary platforms based on the linked device identifiers;

sending the adapted messages from the primary platform to the corresponding auxiliary platforms;

converting the adapted messages to generic messages on each of the auxiliary platforms; and executing the generic messages on the corresponding auxiliary platform to update the data objects on the corresponding auxiliary platform.

3. A method as in claim 2, wherein all data objects supporting a particular transaction are grouped together in the synchronization store database, the method further comprising:

determining that an error is generated with respect to one or more data objects in a group associated with the transaction; and canceling all data objects synchronizations relating to the transaction.

4. A method as in claim 2, wherein all data objects supporting a particular transaction are grouped together in the synchronization store database, the method further comprising:

determining that an error is generated with respect to one or more data objects in a group associated with the transaction; and rolling back all data objects synchronizations relating to the transaction.

5. A system as in claim 1, wherein all data objects supporting a particular transaction are grouped together in the synchronization store database, the at least one computer program further:

determines that an error is generated with respect to one or more data objects in a group associated with the transaction; and cancels all data objects synchronizations relating to the transaction.

6. A system as in claim 1, wherein all data objects supporting a particular transaction are grouped together in the synchronization store database, the at least one computer program product further:

determines that an error is generated with respect to one or more data objects in a group associated with the transaction; and rolls back all data objects synchronizations relating to the transaction.

7. A non-transitory computer program product for synchronizing data objects for a user between a primary platform and a plurality of auxiliary platforms, the computer program product storing instructions which, when executed by at least one data processor forming part of at least one computing system, result in operations comprising accessing a synchronization store database to obtain data characterizing changes to the data objects on the primary platform since a previous synchronization;

creating a set of generic messages identifying changes to the data objects on the primary platform since the previous synchronization based on the data obtained from the synchronization store database, the generic messages being platform independent;

accessing a synchronization database, the database comprising a first table with entries linking a user identifier for the user with two or more device identifiers stored in the database, the device identifiers identifying the plurality of auxiliary platforms, the adapted messages being in a form compatible with underlying synchronization software executing on the corresponding auxiliary platform;

converting the generic messages to adapted messages corresponding to each of the auxiliary platforms based on the linked device identifiers;

sending the adapted messages from the primary platform to the corresponding auxiliary platforms;

converting the adapted messages to generic messages on each of the auxiliary platforms; and executing the generic messages on the corresponding auxiliary platform to update the data objects on the corresponding auxiliary platform.

8. A computer program product as in claim 7, wherein all data objects supporting a particular transaction are grouped together in the synchronization store database, the operations further comprising:

determining that an error is generated with respect to one or more data objects in a group associated with the transaction; and canceling all data objects synchronizations relating to the transaction.

9. A computer program product as in claim 7, wherein all data objects supporting a particular transaction are grouped together in the synchronization store database, the operations further comprising:

determining that an error is generated with respect to one or more data objects in a group associated with the transaction; and rolling back all data objects synchronizations relating to the transaction.

* * * * *